United States Patent
Kamiya et al.

(10) Patent No.: US 9,623,856 B2
(45) Date of Patent: Apr. 18, 2017

(54) HYDRAULIC BRAKING SYSTEM, AIR BLEEDING DEVICE, AND AIR BLEEDING METHOD

(71) Applicants: TOYOTA JIDOSHA KABUSHIKI KAISHA, Toyota-shi, Aichi (JP); ADVICS CO., LTD., Kariya, Aichi (JP)

(72) Inventors: Yusuke Kamiya, Okazaki (JP); Masaaki Komazawa, Miyoshi (JP); Yasuhito Ishida, Toyokawa (JP)

(73) Assignees: TOYOTA JIDOSHA KABUSHIKI KAISHA, Toyota (JP); ADVICS CO., LTD., Kariya (JP)

( * ) Notice: Subject to any disclaimer, the term of this patent is extended or adjusted under 35 U.S.C. 154(b) by 0 days.

(21) Appl. No.: 14/781,840

(22) PCT Filed: Apr. 1, 2014

(86) PCT No.: PCT/JP2014/059624
§ 371 (c)(1),
(2) Date: Oct. 1, 2015

(87) PCT Pub. No.: WO2014/175016
PCT Pub. Date: Oct. 30, 2014

(65) Prior Publication Data
US 2016/0039402 A1 Feb. 11, 2016

(30) Foreign Application Priority Data
Apr. 26, 2013 (JP) .................. 2013-093198

(51) Int. Cl.
*B60T 17/22* (2006.01)
*B60T 7/04* (2006.01)
(Continued)

(52) U.S. Cl.
CPC ............ *B60T 17/222* (2013.01); *B60T 7/042* (2013.01); *B60T 8/4077* (2013.01);
(Continued)

(58) Field of Classification Search
CPC ........ B60T 17/222; B60T 13/662; B60T 7/04; B60T 7/042; B60T 8/40; B60T 8/4013;
(Continued)

(56) References Cited

U.S. PATENT DOCUMENTS 6,193,031 B1 * 2/2001 Baechle .................... B60T 8/34
188/352
6,296,323 B1 * 10/2001 Cords .................. B60T 11/108
303/15
(Continued)

FOREIGN PATENT DOCUMENTS

JP S63-13335 U 1/1988
JP 2005-343297 A 12/2005
(Continued)

Primary Examiner — Thomas J Williams
(74) Attorney, Agent, or Firm — Oliff PLC (57) ABSTRACT

A hydraulic braking system includes: a master cylinder including: a pressurizing piston fluid-tightly and slidably fitted in a housing; a front pressure chamber located in front of the pressurizing piston and connected to a brake cylinder; and a rear chamber located behind the pressurizing piston; a rear-hydraulic-pressure control device connected to the rear chamber of the master cylinder and configured to supply control hydraulic pressure to the rear chamber; and an air bleeding device configured to perform air bleeding for an air bleeding target portion as at least a portion of the rear-hydraulic-pressure control device, in a state in which working fluid is prevented from being supplied to the rear chamber.

7 Claims, 7 Drawing Sheets (51) Int. Cl.
  *B60T 13/14* (2006.01)
  *B60T 13/66* (2006.01)
  *B60T 13/68* (2006.01)
  *B60T 8/40* (2006.01)
  *F15B 21/04* (2006.01)

(52) U.S. Cl.
  CPC .......... *B60T 13/146* (2013.01); *B60T 13/662* (2013.01); *B60T 13/686* (2013.01); *F15B 21/044* (2013.01)

(58) Field of Classification Search
  CPC .... B60T 8/4022; B60T 8/4072; B60T 8/4077; B60T 13/145; B60T 13/146; B60T 13/686; F15B 21/044
  USPC ........................................................ 188/352
  See application file for complete search history.

(56) References Cited

U.S. PATENT DOCUMENTS

| | | | | |
|---|---|---|---|---|
| 9,272,694 | B2* | 3/2016 | Kamiya | B60T 8/3265 |
| 9,511,758 | B2* | 12/2016 | Nakata | B60T 11/16 |
| 2011/0285199 | A1* | 11/2011 | Ishida | B60T 7/042 |
| | | | | 303/3 |
| 2015/0175145 | A1* | 6/2015 | Nakata | B60T 11/16 |
| | | | | 188/352 |
| 2017/0008502 | A1* | 1/2017 | Kanamori | B60T 11/16 |

FOREIGN PATENT DOCUMENTS

| | | | |
|---|---|---|---|
| JP | 2007-182171 A | | 7/2007 |
| JP | 2007186140 A | * | 7/2007 |
| JP | 2010-144752 A | | 7/2010 |
| JP | 2011-240873 A | | 12/2011 |

* cited by examiner

HYDRAULIC BRAKING SYSTEM, AIR BLEEDING DEVICE, AND AIR BLEEDING METHOD

TECHNICAL FIELD

The present invention relates to air bleeding in a hydraulic braking system.

BACKGROUND ART

Patent Documents 1, 2 disclose a hydraulic braking system including: a pump device; a common passage connected to the pump device and brake cylinders provided for front left and right and rear left and right wheels; and a hydraulic pressure control valve device provided between the common passage and each of the brake cylinders.

In the hydraulic braking system disclosed in Patent Document 1, a bypass passage specific to air bleeding is further provided so as to directly connect between a discharge side of the pump device and a reservoir. Also, a bypass cut-off valve is provided, and when air bleeding is performed, the bypass cut-off valve is switched to an open state, and the pump device is actuated. Working fluid is pumped up from the reservoir and discharged by the pump and transferred to the reservoir via the bypass passage. As a result, air bleeding is performed for a passage between a suction side of the pump and the reservoir, the interior of the pump, and surroundings of a discharge opening of the pump, for example.

In the hydraulic braking system disclosed in Patent Document 2, the presence or absence of air in the hydraulic system including the brake cylinders is determined based on a state of change in hydraulic pressure in the brake cylinders.

PRIOR ART DOCUMENTS

Patent Document

Patent Document 1: JP-A-2005-343297
Patent Document 2: JP-A-2007-182171

DISCLOSURE OF THE INVENTION

Object of the Invention

The object of the present invention is to enable air bleeding for at least a portion of a rear-hydraulic-pressure control device connected to a rear chamber defined behind a pressurizing piston in a master cylinder.

Means for Achieving the Object and Effects

A hydraulic braking system according to the invention of the present application includes (i) a master cylinder including a pressurizing piston, (ii) a rear-hydraulic-pressure control device connected to a rear chamber defined behind the pressurizing piston in the master cylinder and configured to supply control hydraulic pressure to the rear chamber, and (iii) an air bleeding device configured to perform air bleeding for at least a portion of the rear-hydraulic-pressure control device.

The air bleeding device performs air bleeding for at least a portion of the rear-hydraulic-pressure control device, thereby discharging air from the rear-hydraulic-pressure control device.

Any of Patent Documents 1, 2 does not disclose the master cylinder having the rear chamber, the rear-hydraulic-pressure control device for supplying the control hydraulic pressure to the rear chamber, or the air bleeding for the rear-hydraulic-pressure control device.

CLAIMABLE INVENTIONS

There will be described by way of examples inventions recognized to be claimable by the present applicant or features of the inventions.

(1) A hydraulic braking system, comprising:
a master cylinder comprising: a pressurizing piston fluid-tightly and slidably fitted in a housing; a front pressure chamber located in front of the pressurizing piston and connected to a brake cylinder, and a rear chamber located behind the pressurizing piston;
a rear-hydraulic-pressure control device connected to the rear chamber of the master cylinder and configured to supply control hydraulic pressure to the rear chamber; and
an air bleeding device configured to perform air bleeding for an air bleeding target portion as at least a portion of the rear-hydraulic-pressure control device, in a state in which working fluid is prevented from being supplied to the rear chamber.

The rear-hydraulic-pressure control device is constituted by a plurality of components, and one or more of the components may be replaced, for example. The air bleeding is performed upon such replacement of the components, and the newly installed components are included in the air bleeding target portion.

Since the rear-hydraulic-pressure control device is connected to the rear chamber, working fluid which may contain air (hereinafter may be referred to simply as "air-contained working fluid") may be unfortunately supplied to the rear chamber during an air bleeding operation. However, the rear chamber is a sealed chamber, and thus once air enters the rear chamber during supply of the air-contained working fluid, the air cannot not be easily discharged. To solve this problem, a bleeder plug for discharging air from the rear chamber can be provided to discharge the air, but this method requires cost of processing and components, resulting in increased cost. Further, a space for providing the bleeder plug is required, for example.

In view of the above-described situations, the hydraulic braking system according to this form is configured such that air bleeding for at least a portion of the rear-hydraulic-pressure control device is performed in a state in which the air-contained working fluid is prevented from being supplied to the rear chamber.

(2) The hydraulic braking system according to the above form (1),
wherein the rear-hydraulic-pressure control device comprises a high pressure source, and
wherein the air bleeding device comprises an air bleeding start device configured to use working fluid in the high pressure source to start air bleeding in a state in which hydraulic pressure in the high pressure source is less than actuation permitting hydraulic pressure.

The actuation permitting hydraulic pressure can be set at a small value close to atmospheric pressure, for example.

In the air bleeding, working fluid in the high pressure source included in the rear-hydraulic-pressure control device is caused to flow to the air bleeding target portion.

When hydraulic pressure in the rear-hydraulic-pressure control device becomes higher than or equal to supply start pressure, the working fluid is typically supplied to the rear chamber. Thus, the working fluid is not easily supplied to the rear chamber while hydraulic pressure of the working fluid for flowing through the air bleeding target portion (i.e., working fluid used for air bleeding) is low. Also, the hydraulic pressure is not easily increased while air is contained. Accordingly, by starting air bleeding in a state in which the hydraulic pressure in the high pressure source is lower than actuation start hydraulic pressure, the air bleeding can be completed before the hydraulic pressure of the working fluid reaches the supply start pressure.

It is noted that when the hydraulic pressure in the high pressure source is lower than the actuation permitting hydraulic pressure, hydraulic pressure in the air bleeding target portion can be considered to be also lower than the actuation permitting hydraulic pressure.

(3) The hydraulic braking system according to the above form (1) or (2), wherein the rear-hydraulic-pressure control device comprises a pump device and a low pressure source, and wherein the air bleeding device comprises (i) an air bleeding path forming device configured to form an air bleeding path comprising the air bleeding target portion and (ii) a pump-device control device configured to operate the pump device to cause the working fluid to flow to the air bleeding path formed by the air bleeding path forming device and to be discharged to the low pressure source.

The pump device may be considered to be located on the air bleeding path and may be considered to be independent of the air bleeding path. In the case where it is considered that the pump device supplies the working fluid to the air bleeding path, the pump device is independent of the air bleeding path, and in the case where it is considered that a pump as a component of the pump device can be included in the air bleeding target portion, the pump device is located on the air bleeding path. This is because air can be discharged from the pump by operating the pump to pump up and discharge the working fluid.

The pump device can be kept operated for a set length of time. The set length of time is set at, for example, a time determined based on a time that can be used to estimate that air has been discharged from the air bleeding path, and this set length of time may be referred to as "air discharge time".

The air discharge time may be set at a predetermined time or a time that is determined as necessary based on, e.g., the air bleeding target portion and the flow rate of the working fluid. In the case where a hydraulic sensor is provided on the air bleeding path, a timing at which the pump device is stopped may be determined based on a detection value of the hydraulic sensor.

(4) The hydraulic braking system according to the above form (3), wherein the rear-hydraulic-pressure control device comprises at least one electromagnetic valve, and wherein the air bleeding path forming device comprises an electromagnetic valve controller configured to establish an open state of at least one of the at least one electromagnetic valve to form the air bleeding path.

For example, the establishment of the open state of the electromagnetic valve fluidically couples the pump device, the air bleeding target portion, and the low pressure source with each other to form the air bleeding path.

(5) The hydraulic braking system according to any one of the above forms (1) through (4), wherein the rear-hydraulic-pressure control device comprises a high pressure source and a regulator comprising (a) a control piston, (b) a servo chamber formed in front of the control piston and connected to the rear chamber, (c) a control pressure chamber formed behind the control piston, the air bleeding path passing through the control pressure chamber, and (d) a high-pressure supply valve provided between the servo chamber and a high pressure chamber connected to the high pressure source, the high-pressure supply valve being configured to be switched from a closed state to an open state when the control piston is moved forward by greater than or equal to a set stroke.

When an increase in hydraulic pressure in the control pressure chamber increases a forward force acting on the control piston, and thereby the control piston is moved forward by longer than or equal to the set stroke, the high-pressure supply valve is opened, so that hydraulic pressure in the high pressure chamber is supplied to the rear chamber via the servo chamber. It is possible to consider that the supply start pressure in the form (2) is, for example, a magnitude of the hydraulic pressure in the control pressure chamber in the case where the high-pressure supply valve is switched from the closed state to the open state.

(6) The hydraulic braking system according to the above form (5), wherein the air bleeding device comprises a regulator-actuation preventing device configured to prevent the high-pressure supply valve from being switched to the open state by forward movement of the control piston.

Since the high pressure source is connected to the high pressure chamber, the air-contained working fluid is supplied to the high pressure chamber in some cases. Thus, the air bleeding operation is preferably performed in the closed state of the high-pressure supply valve. In other words, the hydraulic pressure in the control pressure chamber may increase within a range in which the control piston is not moved forward by longer than or equal to the set stroke.

(7) The hydraulic braking system according to any one of the above forms (1) through (6), wherein the rear-hydraulic-pressure control device comprises (i) a pump device and (ii) an accumulator configured to store working fluid discharged from the pump device in a pressurized state, and wherein the air bleeding device comprises an air-bleeding-state determining device configured to determine that air is in the air bleeding target portion when a time required for hydraulic pressure in the accumulator to reach set pressure from actuation of the pump device is greater than an air presence judgment time.

The remaining state of the air is determined after the working fluid is caused to flow to the air bleeding path (after the pump device is operated for an air bleeding time).

(8) The hydraulic braking system according to the above form (7), wherein the air-bleeding-state determining device comprises an air-presence-judgment-time determining device configured to determine the air presence judgment time to a time that is shorter when a flow rate of the working fluid discharged from the pump device is high than when the flow rate of the working fluid discharged from the pump device is low.

(9) The hydraulic braking system according to the above form (7) or (8), wherein the air bleeding device comprises at least one of (i) a notification device configured to, when the air-bleeding-state determining device determines that air is in the air bleeding target portion, notify that air is in the air bleeding target portion and (ii) a re-executing device configured to form the air bleeding path to operate the pump device.

(10) The hydraulic braking system according to any one of the above forms (1) through (9), further comprising: an air bleeding instruction device configured to, in response to an air bleeding instruction, inhibit original control of the rearhydraulic-pressure control device and instruct the air bleeding device to perform air bleeding; and a post-air-bleeding-completion permitting device configured to permit the original control of the rear-hydraulic-pressure control device after air bleeding is finished.

In the case where, for example, components of the rear-hydraulic-pressure control device are replaced, the original control to be executed for the rear-hydraulic-pressure control device (e.g., control of hydraulic pressure in the rear chamber and control relating to the control of the hydraulic pressure in the rear chamber) is principally inhibited. This is because air may unfortunately spread when the original control is executed after the components are replaced and before air bleeding is performed. On the other hand, the original control of the rear-hydraulic-pressure control device is permitted in the case where the air bleeding is finished (for example, in the case where the air bleeding is succeeded and the air-remaining-state determining device determines that no air remains).

(11) An air bleeding method for performing air bleeding for an air bleeding target portion as at least a portion of a rear-hydraulic-pressure control device connected to a rear chamber of a master cylinder which is formed behind a pressurizing piston of the master cylinder, the rear-hydraulic-pressure control device being configured to supply control hydraulic pressure to the rear chamber, wherein air bleeding is performed for the air bleeding target portion in a state in which working fluid is prevented from being supplied to the rear chamber.

The technical feature according to any one of the above forms (1) through (10) may be adopted into the air bleeding method according to this form.

(12) The air bleeding method according to the above form (11), comprising:

an air bleeding path forming step of forming an air bleeding path comprising the air bleeding target portion, in the rear-hydraulic-pressure control device; and a pump operating step of operating a pump device for an air bleeding time to cause working fluid to flow into the air bleeding path and be discharged to a low pressure source.

(13) The air bleeding method according to the above form (11) or (12), comprising:

a working fluid flowing step of operating the pump device to cause the working fluid to flow to a portion of the rear-hydraulic-pressure control device which comprises the air bleeding target portion, and to be discharged to the low pressure source; and an air bleeding checking step of checking a remaining state of air in the air bleeding target portion after the working fluid flowing step.

The air bleeding operation includes the working fluid flowing step and the check step.

(14) An air bleeding device configured to perform air bleeding for an air bleeding target portion as at least a portion of a rear-hydraulic-pressure control device connected to a rear chamber of a master cylinder which is formed behind a pressurizing piston of the master cylinder, the rear-hydraulic-pressure control device being configured to supply control hydraulic pressure to the rear chamber, the air bleeding device comprising a working-fluid communicating device configured to perform air bleeding by causing working fluid to flow to the air bleeding target portion in a state in which the working fluid is prevented from being supplied to the rear chamber.

The technical feature according to any one of the above forms (1) through (13) may be adopted into the air bleeding device according to this form.

This air bleeding device may be provided in a vehicle or a factory, for example. Providing this air bleeding device in the vehicle eliminates the need of providing the air bleeding device in the factory or the like, resulting in increase in opportunities of the air bleeding. The hydraulic braking system according to any one of the above forms (1) through (10) can also be considered to be constituted by combination of the air bleeding device provided in a factory or the like and the hydraulic braking system provided in a vehicle (not including the air bleeding device).

(15) An air bleeding device configured to perform air bleeding for an air bleeding target portion as at least a portion of a hydraulic-pressure control device comprising a pump device, the air bleeding device comprising a working-fluid communicating device configured to perform air bleeding by actuating the pump device to cause working fluid to flow to the air bleeding target portion in a state in which hydraulic pressure in the air bleeding target portion is less than actuation permitting hydraulic pressure.

The technical feature according to any one of the above forms (1) through (14) may be adopted into the air bleeding device according to this form.

The hydraulic-pressure control device may be configured as a rear-hydraulic-pressure control device, for example, but may be configured as other devices.

The hydraulic pressure in the air bleeding target portion need not be actually detected by a hydraulic sensor or other similar devices and at least needs to be estimated to be in a state in which the hydraulic pressure in the air bleeding target portion is lower than the actuation permitting hydraulic pressure. For example, it is possible to determine that the hydraulic pressure in the air bleeding target portion is lower than the actuation permitting hydraulic pressure in the case where a component or components are replaced or in the case where a repair is made in a state in which the working fluid is removed.

EMBODIMENTS OF THE INVENTION

Hereinafter, there will be described a hydraulic braking system according to one embodiment of the present invention by reference to drawings. This hydraulic braking system includes an air bleeding device according to one embodiment of the present invention. In this air bleeding device, an air bleeding method according to one embodiment of the present invention is implemented.

It is noted that the present hydraulic braking system may be installed in hybrid vehicles, electric vehicles, fuel-cell vehicles, and internal combustion vehicles. In the case where the present hydraulic braking system is installed in a vehicle such as the hybrid vehicles, the electric vehicles, and the fuel-cell vehicles, a regenerative braking force is applied to drive wheels, and regenerative cooperative control is executed. However, the regenerative cooperative control is not executed in the internal combustion vehicle. In the present hydraulic braking system, in any case, a braking force of a hydraulic brake is electrically controlled to have a desired magnitude.

Embodiment 1

Configuration of Hydraulic Braking System

Figure 1:
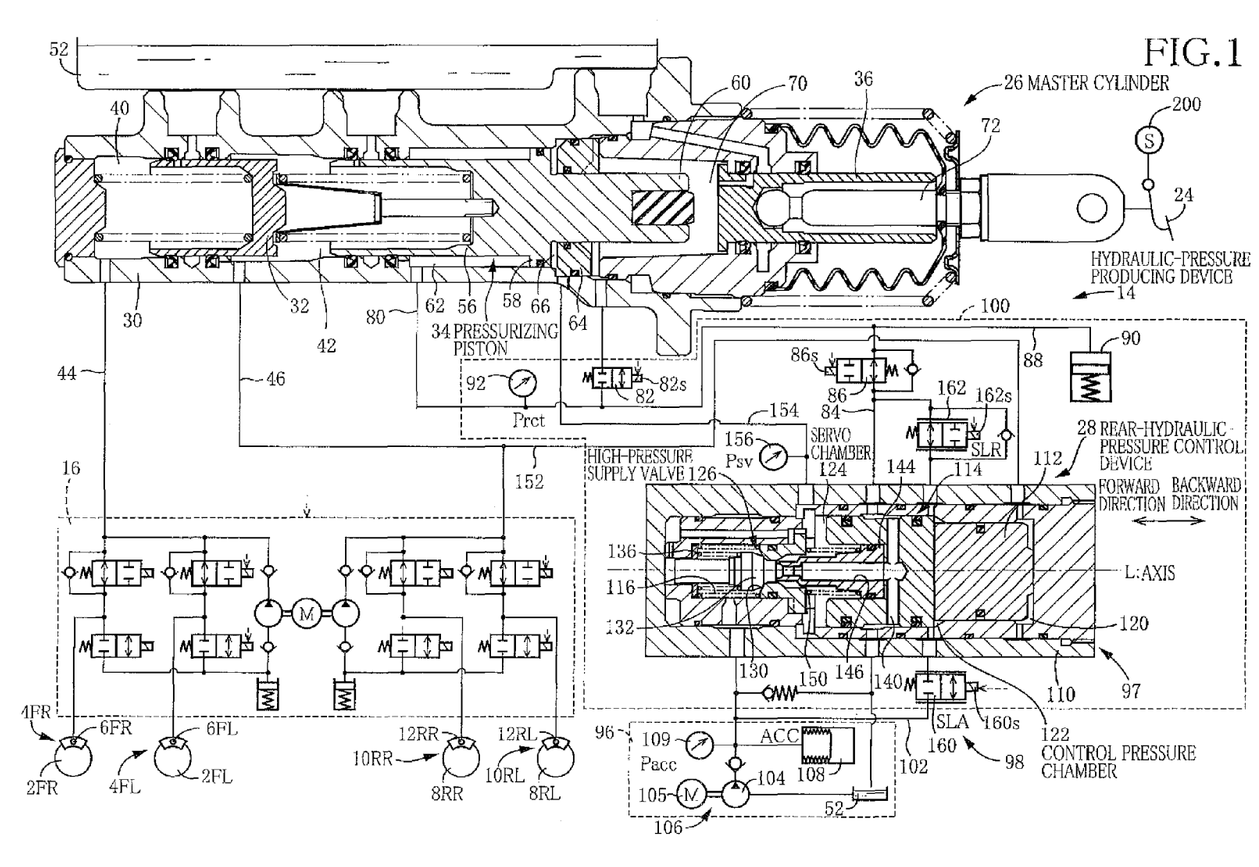
FIG. 1 is a circuit diagram illustrating a hydraulic braking system according to Embodiment 1 of the present invention. This hydraulic braking system includes an air bleeding device. Also, an air bleeding method is implemented in the present hydraulic braking system.

As illustrated in FIG. 1, the hydraulic brake system includes (i) brake cylinders 6FL, 6FR of hydraulic brakes 4FL, 4FR respectively provided for front left and right wheels 2FL, 2FR, and brake cylinders 12RL, 12RR of hydraulic brakes 10RL, 10RR respectively provided for rear left and right wheels 8RL, 8RR, (ii) a hydraulic-pressure producing device 14 capable of supplying hydraulic pressure to these brake cylinders 6FL, 6FR, 12RL, 12RR, and (iii) a slip control valve device 16 provided between the hydraulic-pressure producing device 14 and the brake cylinders 6FL, 6FR, 12RL, 12RR. Devices such as the hydraulic-pressure producing device 14 and the slip control valve device 16 are controlled by a brake ECU 20 (see FIG. 2) constituted mainly by a computer.

[Hydraulic-Pressure Producing Device]

The hydraulic-pressure producing device 14 includes (i) a brake pedal 24 as a brake operating member, (ii) a master cylinder 26, (iii) a rear-hydraulic pressure control device 28 configured to control hydraulic pressure in a rear chamber of the master cylinder 26.

{Master Cylinder}

The master cylinder 26 includes (a) a housing 30 and (b) pressurizing pistons 32, 34 and an input piston 36 arranged in series and fluid-tightly and slidably fitted in a cylinder bore formed in the housing 30.

Front pressure chambers 40, 42 are defined in front of the respective pressurizing pistons 32, 34. The brake cylinders 6FL, 6FR of the hydraulic brakes 4FL, 4FR provided for the respective front left and right wheels 2FL, 2FR are connected to the front pressure chamber 40 by a fluid passage 44, while the brake cylinders 12RL, 12RR of the hydraulic brakes 10RL, 10RR provided for the respective rear left and right wheels 8RL, 8RR are connected to the front pressure chamber 42 by a fluid passage 46. The hydraulic pressure supplied to each of the brake cylinders 6FL, 6FR, 12RL, 12RR actuates a corresponding one of the hydraulic brakes 4FL, 4FR, 10RL, 10RR to restrain rotation of a corresponding one of the wheels 2FL, 2FR, 8RL, 8RR.

In the following description, where the distinction of wheels is not required, each of devices such as the hydraulic brakes may be referred without suffixes (FL, FR, RL, RR) indicative of the corresponding wheels.

Return springs are respectively provided between the pressurizing piston 32 and the housing 30 and between the two pressurizing pistons 32, 34 to urge the pressurizing pistons 32, 34 backward. When the pressurizing pistons 32, 34 are located at their respective back end positions, the front pressure chambers 40, 42 are in communication with a reservoir 52.

The pressurizing piston 34 includes (a) a front piston portion 56 provided in a front portion thereof, (b) an intermediate piston portion 58 provided in an intermediate portion of the pressurizing piston 34 so as to protrude in its radial direction, and (c) a rear small-diameter portion 60 provided in a rear portion of the pressurizing piston 34 and having a smaller diameter than the intermediate piston portion 58. The front piston portion 56 and the intermediate piston portion 58 are fluid-tightly and slidably fitted in the housing 30. A space in front of the front piston portion 56 is the front pressure chamber 42, and a space in front of the intermediate piston portion 58 is an annular chamber 62.

The housing 30 is provided with an annular inner-circumferential-side protruding portion 64, and the rear portion of the intermediate piston portion 58, i.e., the rear small-diameter portion 60 is fluid-tightly and slidably fitted in the inner-circumferential-side protruding portion 64. As a result, a rear chamber 66 is formed at a rear of the intermediate piston portion 58 and between the intermediate piston portion 58 and the inner-circumferential-side protruding portion 64.

The input piston 36 is located at a rear of the pressurizing piston 34, and an input chamber 70 is defined between the rear small-diameter portion 60 and the input piston 36. The brake pedal 24 is engaged with a rear portion of the input piston 36 by an operating rod 72 and other components.

The annular chamber 62 and the input chamber 70 are connected to each other by a connecting passage 80. A communication control valve 82 is provided in the connecting passage 80. The communication control valve 82 is an electromagnetic open/close valve which is opened and closed according to a state of current supplied to a coil 82s, specifically, the communication valve 82 is a normally closed valve which establishes its closed state when no current is supplied to the coil 82s. A portion of the connecting passage 80 which is located on one of opposite sides of the communication control valve 82 which is nearer to the annular chamber 62 is connected to the reservoir 52 by a reservoir passage 84 in which a reservoir cut-offvalve 86 is provided. The reservoir cut-offvalve 86 is an electromagnetic open/close valve which is opened and closed according to a state of current supplied to a coil 86s, specifically, the reservoir cut-offvalve 86 is a normally open valve which establishes its open state when no current is supplied to the coil 86s.

A stroke simulator 90 is connected, by a simulator passage 88, to the portion of the connecting passage 80 which is located on one of opposite sides of the communication control valve 82 which is nearer to the annular chamber 62. The stroke simulator 90 is connected to the input chamber 70 by the simulator passage 88 and the connecting passage 80.

A hydraulic sensor 92 is provided in a portion of the connecting passage 80 which is located on one of opposite sides of the portion thereof to which the reservoir passage 84 is connected, and the one of opposite sides is nearer to the annular chamber 62. The hydraulic sensor 92 detects hydraulic pressure in the annular chamber 62 and the input chamber 70 in a state in which the annular chamber 62 and the input chamber 70 are in communication with each other and isolated from the reservoir 52. The hydraulic pressure detected by the hydraulic sensor 92 has a magnitude related to an operating force of the brake pedal 24. Accordingly, the hydraulic sensor 92 can be referred to as "operating-force sensor" and "operation-related hydraulic sensor".

{Rear-Hydraulic-Pressure Control Device}

The rear-hydraulic pressure control device 28 is connected to the rear chamber 66.

The rear-hydraulic-pressure control device 28 includes (a) a high pressure source 96, (b) a regulator 97, and (c) a linear valve device 98. The high pressure source 96 constitutes a single unit (a pump unit 96), while the regulator 97, the linear valve device 98, and other components constitute a single unit (a regulator unit 100). The pump unit 96 and the regulator unit 100 are connected to each other by a high pressure line 102.

The high pressure source 96 includes: a pump device 106 including a pump 104 and a pump motor 105; and an accumulator 108 configured to accumulate working fluid discharged from the pump device 106 in a pressurized state. Hydraulic pressure of the working fluid accumulated in the accumulator 108 is called accumulator pressure which is detected by an accumulator pressure sensor 109. The pump motor 105 is controlled so as to keep the accumulator pressure within a predetermined range. Specifically, the pump motor 105 is actuated when the hydraulic pressure in the accumulator 108 is made lower than a lower limit pressure PL of a set range by execution of an accumulator-pressure control program, and the pump motor 105 is stopped when the hydraulic pressure in the accumulator 108 exceeds an upper limit pressure PH of the set range.

The regulator 97 includes (d) a housing 110, and (e) a pilot piston 112 and a control piston 114 provided in the housing 110 so as to be arranged in series in a direction parallel to an axis L. The housing 110 has a stepped cylinder bore which includes: a large diameter portion in which the pilot piston 112 and the control piston 114 are fluid-tightly and slidably fitted; and a small diameter portion having a high pressure chamber 116 connected to the high pressure source 96. A space between the pilot piston 112 and the housing 110 is a pilot pressure chamber 120, a space at a rear of the control piston 114 is a control pressure chamber 122, and a space between the control piston 114 and a step between the large diameter portion and the small diameter portion of the cylinder bore is a servo chamber 124. Also, a high-pressure supply valve 126 is provided between the servo chamber 124 and the high pressure chamber 116.

The high-pressure supply valve 126 is a normally closed valve and includes (f) a seat 130, (g) a valve member 132 which can be seated on and moved off the seat 130, and (h) a spring 136 for applying an elastic force onto the valve member 132 in a direction in which the seat 130 is to be seated (i.e., a backward direction).

A central portion of a main body of the control piston 114 has: a mating hole extending parallel to the axis L; and a fluid passage 140 having a portion extending in a direction perpendicular to the axis L (i.e., a radial direction) and communicating with the mating hole. The fluid passage 140 is always in communication with a low pressure port connected to the reservoir 52.

A valve opening member 144 extending parallel to the axis L is fitted in the mating hole. The valve opening member 144 has: a central portion in which is formed an axial direction passage 146 extending parallel to the axis L; a rear end portion which opens to the fluid passage 140; and a front end portion which opposes the valve member 132. The low pressure port and the front end portion of the valve opening member 144 which opposes the valve member 132 are connected to each other by the axial direction passage 146 and the fluid passage 140.

A spring 150 is provided between the valve opening member 144 and the housing 110 to urge the control piston 114 (having the valve opening member 144) in its backward direction.

As described above, the control piston 114 has a generally stepped shape, and the control pressure chamber 122 is located at a rear of a large diameter portion of the control piston 114, while the servo chamber 124 is located in front of a step between the large diameter portion and a small diameter portion of the control piston 114. Accordingly, the control piston 114 functions as a pressure increase piston and increases hydraulic pressure in the servo chamber 124 with respect to hydraulic pressure in the control pressure chamber 122.

It is noted that the pilot pressure chamber 120 is connected to the fluid passage 46 by a pilot passage 152. Thus, hydraulic pressure in the pressure chamber 42 of the master cylinder 26 acts on the pilot piston 112.

The rear chamber 66 of the master cylinder 26 is connected to the servo chamber 124 by a servo passage 154. Since the servo chamber 124 and the rear chamber 66 are directly connected to each other, the hydraulic pressure in the servo chamber 124 and the hydraulic pressure in the rear chamber 66 are principally equal to each other. It is noted that a servo-hydraulic-pressure sensor 156 is provided in the servo passage 154 to detect servo hydraulic pressure.

The linear valve device 98 including a pressure-increasing linear valve 160 and a pressure-reduction linear valve 162 is connected to the control pressure chamber 122. The hydraulic pressure in the control pressure chamber 122 is controlled by control of currents supplied to a coil 160s of the pressure-increasing linear valve 160 and a coil 162s of the pressure-reduction linear valve 162.

[Slip Control Valve Device]

The slip control valve device 16 includes a plurality of electromagnetic valves which can be controlled by the slip control valve device 16 to individually control hydraulic pressure in each of the brake cylinders 6, 12. By controlling the hydraulic pressure in each of the brake cylinders 6, 12, the slip control valve device 16 corrects a slip state of each of the wheels 2, 8 to an appropriate state.

[Brake ECU]

Figure 2:
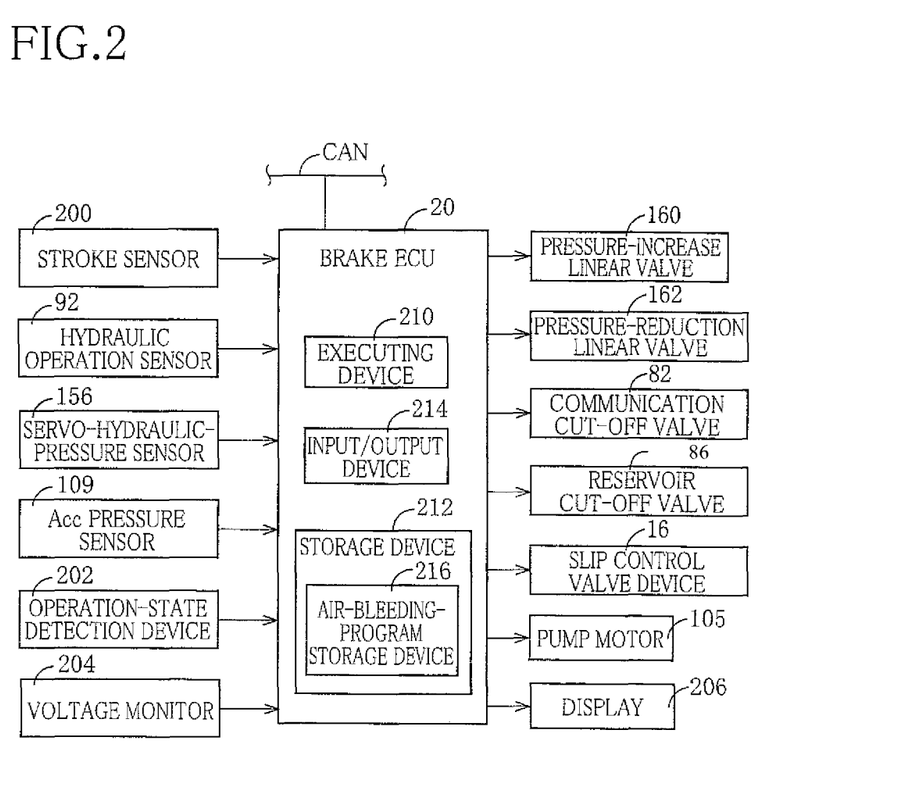
FIG. 2 is a view illustrating a brake ECU of the hydraulic braking system and devices connected to the brake ECU.

As illustrated in FIG. 2, devices connected to the brake ECU 20 include: the operation hydraulic sensor 92; the accumulator pressure sensor 109; the servo-hydraulic-pressure sensor 156; a stroke sensor 200 configured to detect a stroke of the brake pedal 24 (hereinafter may be referred to as "operating stroke"); an operation-state detection device 202 configured to detect an operation state of an operation member mounted on the vehicle such as an accelerator pedal, not shown, and the brake pedal 24; a voltage monitor 204 configured to detect a voltage of the pump motor 105; the pump motor 105; the coils of the electromagnetic valves such as the pressure-increase linear valve 160 and the pressure-reduction linear valve 162; and a display 206.

The brake ECU 20 is constituted mainly by a computer including an executing device 210, a storage device 212, and an input/output device 214. The storage device 212 includes an air-bleeding-program storage device 216 storing an air bleeding program illustrated in a flow chart in FIG. 3. The storage device 212 stores programs, tables, and other data such as an air presence/absence judgment time determination table indicated by a map in FIG. 4.

<Operations in Hydraulic Braking System>

[Normal Braking Control]

The regenerative cooperative control is principally executed in the case where the present hydraulic braking system is installed in a vehicle such as the electric vehicles and the hybrid vehicles.

For example, a brake request is issued when the brake pedal 24 is depressed by a driver, for example. When the regenerative braking force is enough for a braking force required based on the brake request, the hydraulic brakes 4, 10 are not actuated.

The linear valve device 98 is not controlled, and the regulator 97 is in its non-operating state. Hydraulic pressure is not supplied to the rear chamber 66 of the master cylinder 26.

In the master cylinder 26, the communication control valve 82 is opened, and the reservoir cut-off valve 86 is closed, so that the input chamber 70 and the annular chamber 62 communicate with each other, are isolated from the reservoir 52, and communicate with the stroke simulator 90. Forward movement of the brake pedal 24 advances the input piston 36 relative to the pressurizing piston 34, thereby actuating the stroke simulator 90.

The area of a pressure receiving surface of the intermediate piston portion 58 which faces the annular chamber 62 is equal to that of the rear small-diameter portion 60 which faces the input chamber 70. Thus, in the pressurizing piston 34, a forward force generated due to the hydraulic pressure in the input chamber 70 is balanced with a backward force generated due to hydraulic pressure in the annular chamber 62. In this state, the pressurizing piston 34 is not moved forward principally, so that no hydraulic pressure is generated in the front pressure chambers 40, 42. No hydraulic pressure is supplied to the brake cylinders 6, 12, and each of the hydraulic brakes 4, 10 is in its non-operating state.

When the regenerative braking force is not enough for the braking force requested by the driver, on the other hand, the hydraulic brakes 4, 10 are actuated.

In the regulator 97, the linear valve device 98 is controlled to increase the hydraulic pressure in the control pressure chamber 122. When this increase in the hydraulic pressure in the control pressure chamber 122 makes a forward force acting on the control piston 114 larger than the elastic force of the spring 150, the control piston 114 is moved forward and brought into contact with the valve member 132. The fluid passage 146 is closed, and the servo chamber 124 is isolated from the reservoir 52, resulting in increase in the hydraulic pressure. When the forward force acting on the control piston 114 becomes larger than the elastic forces of the springs 136, 150, the high-pressure supply valve 126 is switched to its open state, and the servo chamber 124 communicates with the high pressure chamber 116, so that servo hydraulic pressure Psb is supplied to the rear chamber 66. In the master cylinder 26, the hydraulic pressure in the rear chamber 66 moves the pressurizing piston 34 forward, so that hydraulic pressure is generated in the front pressure chambers 40, 42 and supplied to the brake cylinders 6, 12 to actuate the hydraulic brakes 4, 10.

Thus, the hydraulic pressure in each of the brake cylinders 6, 12 is controlled by the control of the linear valve device 98 such that the hydraulic braking force and the regenerative braking force are sufficient for the braking force requested by the driver.

In the case where the present hydraulic braking system is mounted on the internal combustion vehicle or in the case where the regenerative cooperative control is not executed, the linear valve device 98 is controlled such that the hydraulic brakes 4, 10 generate a force enough for the braking force requested by the driver.

[Air Bleeding]

In the case where the high pressure line 102 is replaced in a repair/check factory, for example, the high pressure line 102 is dry, and air exists in the high pressure line 102. Air bleeding of the rear-hydraulic-pressure control device 28 is performed in such a case. In the present embodiment, the air bleeding is performed in two steps, namely, a working fluid flowing step (a working fluid circulating step) and a check step.

{Working Fluid Flowing Step}

Figure 6:
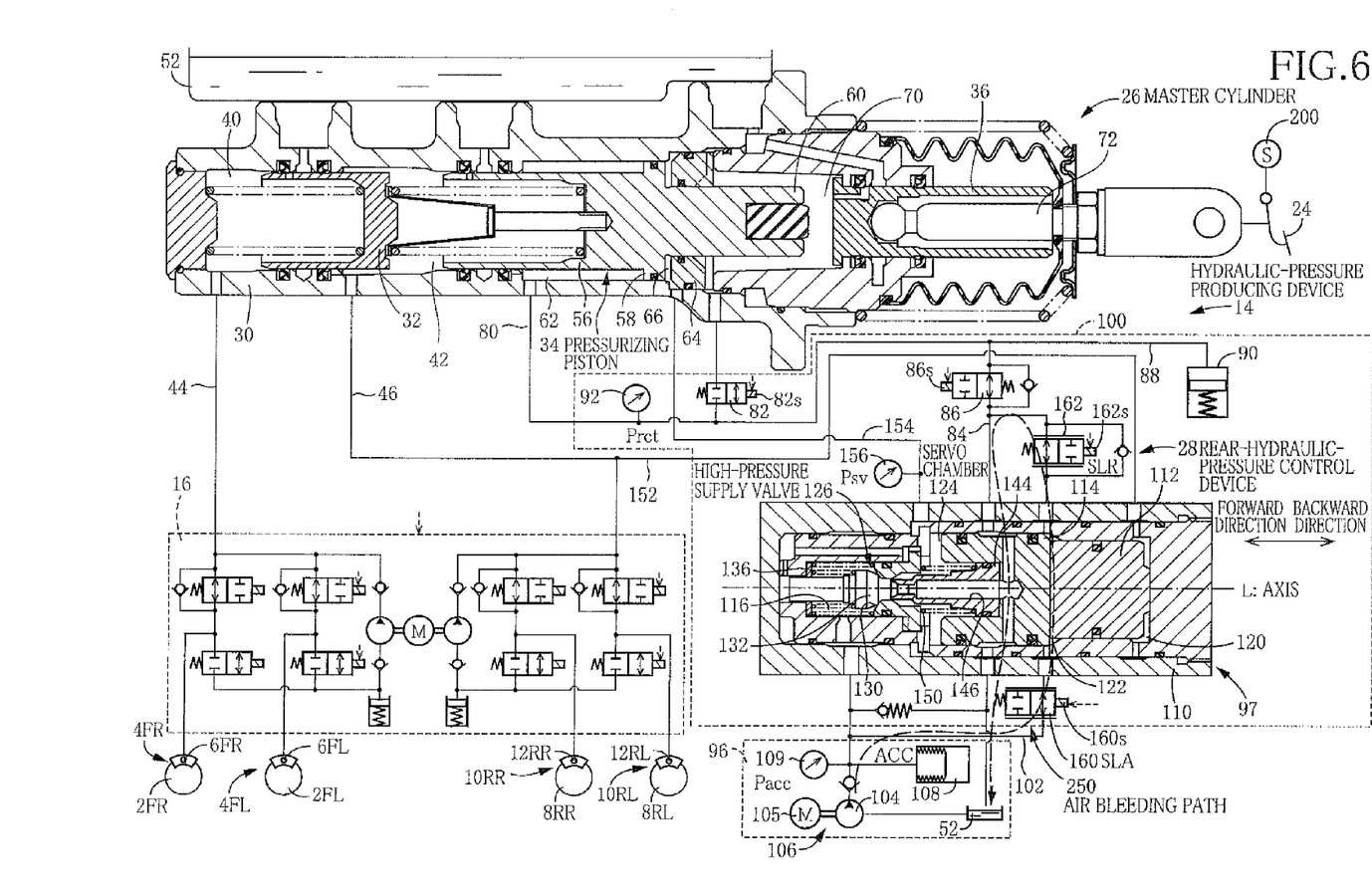
FIG. 6 is a view illustrating an air bleeding path formed in the case where the air bleeding program is executed in the hydraulic braking system.
Figure 7:
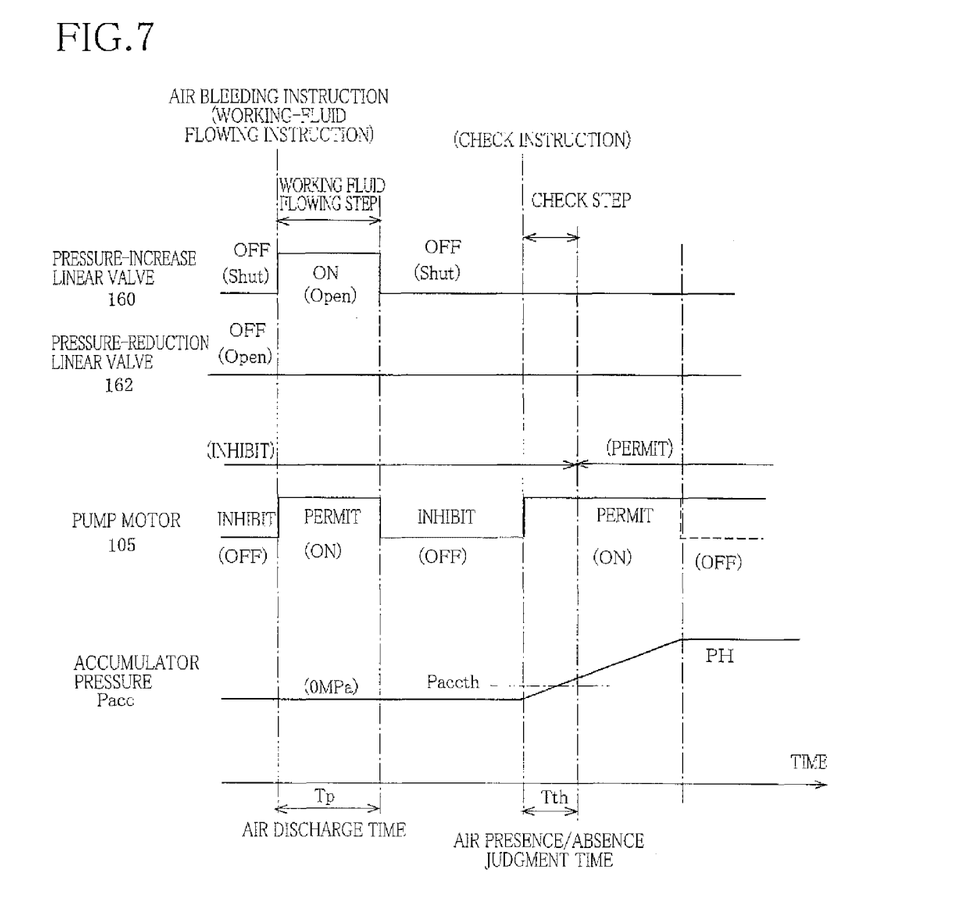
FIG. 7 is a view illustrating an operating state in the case where the air bleeding program is executed in the hydraulic braking system.

As illustrated in FIG. 7, when an air bleeding instruction is issued, the pressure-increase linear valve 160 is switched to its open state, so that the pump 104, the line 102, the pressure-increase linear valve 160, the control pressure chamber 122, the pressure-reduction linear valve 162, the reservoir passage 84, and the reservoir 52 (the pump 104) communicate with each other to form an air bleeding path 250 as illustrated in FIG. 6. The pump motor 105 is then driven to actuate the pump 104, whereby the working fluid is supplied to the air bleeding path 250 and discharged to the reservoir 52. As a result, the air in the line 102 and the pump 104 is discharged.

In the present embodiment, the pump device 106 is stopped after operated for a predetermined air discharge time Tp. Also, the pressure-increase linear valve 160 is switched back to its closed state.

Since the air bleeding path 250 passes through the control pressure chamber 122, when the hydraulic pressure in the control pressure chamber 122 increases in this working fluid flowing step, the regulator 97 may be actuated. If the control piston 114 is moved forward, and the high-pressure supply valve 126 is opened, the high pressure chamber 116 connected to the high pressure source 96 is caused to communicate with the servo chamber 124 and with the rear chamber 66. Since the high pressure source 96 is connected to the high pressure chamber 116 via the line 102, air may enter the high pressure source 96. Thus, working fluid which may contain air (hereinafter may be simply referred to as "air-contained working fluid") may be supplied to the rear chamber 66.

Since the rear chamber 66 is a sealed chamber, if air is trapped in the rear chamber 66, it is difficult to discharge the air from the rear chamber 66. A bleeder plug can be provided for discharging air from the rear chamber 66, which leads to higher cost, unfortunately. In addition, a space for providing the bleeder plug is required.

To solve these problems, in the present embodiment, the working fluid is caused to flow through the air bleeding path 250 in a state in which the air-contained working fluid is prevented from being supplied to the rear chamber 66, in other words, in a state in which the hydraulic pressure in the control pressure chamber 122 is not easily increased. Specifically, the working fluid flowing step is started (that is, the pump motor 105 is actuated) in a state in which hydraulic pressure Pacc of the accumulator 108 is lower than or equal to actuation permitting hydraulic pressure Pao.

In the case where air is in the air bleeding path 250, hydraulic pressure in the air bleeding path 250 is not easily increased. Accordingly, by starting the air bleeding in a state in which the hydraulic pressure in the accumulator 108 is low, the forward movement of the control piston 114 can be prevented during the air discharge time.

After the air is discharged, the hydraulic pressure in the air bleeding path 250 may increase due to, e.g., a passage resistance of the air bleeding path 250. However, the control piston 114 is not moved forward while a forward force related to the hydraulic pressure in the control pressure chamber 122 is smaller than the elastic force of the spring 150. Also, even in the case where the control piston 114 has been moved forward, the high-pressure supply valve 126 is kept in the closed state while the forward force related to the hydraulic pressure in the control pressure chamber 122 is smaller than the elastic forces of the springs 136, 150. Thus, it is possible to consider that even when the hydraulic pressure in the air bleeding path 250 is increased in some degree, the air-contained working fluid is not supplied to the rear chamber 66 because the servo chamber 124 is isolated from the high pressure chamber 116.

It is noted that the reservoir cut-off valve 86 is kept open, and a check valve provided in parallel with the reservoir cut-off valve 86 allows a flow of the working fluid from the regulator 97 toward the simulator passage 88, but the simulator passage 88 and so on are fluidically tight, and accordingly the air-contained working fluid can be considered not to be supplied to, e.g., the annular chamber 62.

{Check Step}

The check step is implemented after the working fluid flowing step.

At the completion of the working fluid flowing step, the pressure-increase linear valve 160 is in the closed state, and thus the high pressure source. 96 is isolated from the reservoir 52 and the control pressure chamber 122. The pump 104 is actuated by the pump motor 105 in this state to increase a value detected by the accumulator pressure sensor 109. When the hydraulic pressure in the accumulator 108 exceeds a set pressure Paccth before the air presence/absence judgment time passes, it is determined that no air exists, that is, the air bleeding is completed (that is, the air bleeding has succeeded).

At the completion of the working fluid flowing step, as described above, the pressure-increase linear valve 160 is switched to the closed state, but the pump motor 105 is also stopped, and accordingly the hydraulic pressure in the accumulator 108 (i.e., the hydraulic pressure in the high pressure source 96) is not increased by the working fluid discharged from the pump 104 before the start of the check step. As illustrated in FIG. 7, the pump motor 105 is actuated at the start of the check step to start increasing the hydraulic pressure in the accumulator 108. This configuration enables accurate determination of the presence or absence of the air.

It is noted that, also in the check step, since the pump motor 105 is actuated in the state in which the high pressure source 96 is isolated from the control pressure chamber 122 of the regulator 97, the working fluid at high pressure is prevented from being supplied to the control pressure chamber 122, thereby preventing supply of the air-contained working fluid to the rear chamber 66.

Figure 5:
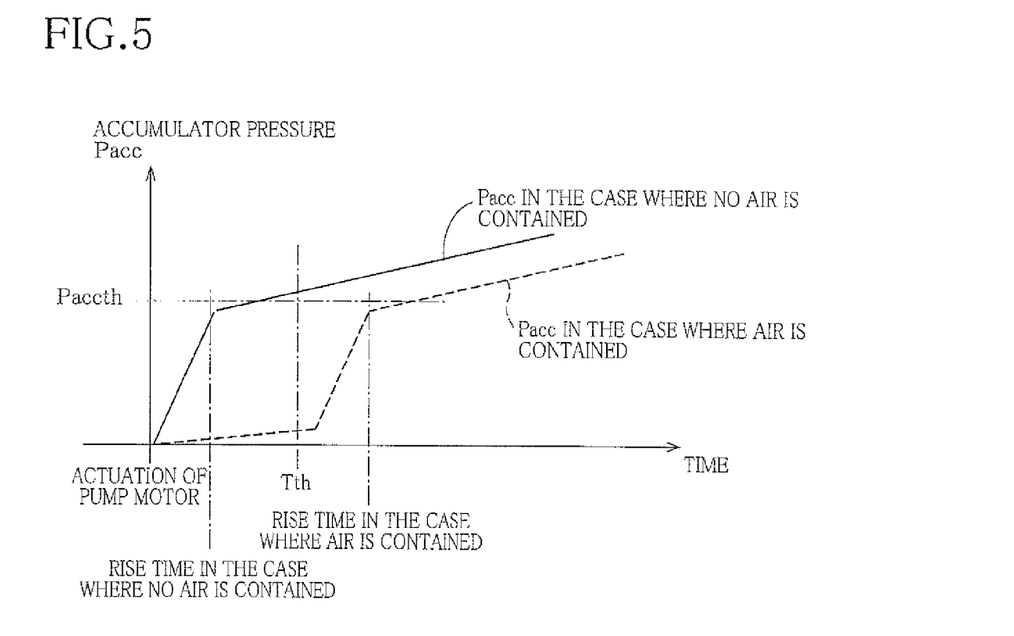
FIG. 5 is a view illustrating changes of accumulator pressure in the case where the air bleeding program is executed in the hydraulic braking system.

The accumulator 108 includes an elastic member and, precisely speaking, pressure accumulation of the working fluid is not performed while a force related to the hydraulic pressure of the working fluid is lower than initial pressure (fill start pressure) determined by a set load of the elastic member. However, since the high pressure source 96 is isolated from the reservoir 52, as illustrated in FIG. 5, the hydraulic pressure in the accumulator 108 (i.e., the hydraulic pressure in the high pressure source 96) is rapidly increased until the hydraulic pressure reaches the initial pressure. When the hydraulic pressure in the accumulator 108 thereafter becomes higher than or equal to the initial pressure, the pressure accumulation of the working fluid is started against an elastic force of the elastic member, and the hydraulic pressure of the working fluid is increased with increase in the elastic force.

In the case where air exists in the working fluid, the air needs to be compressed, which delays increase in the hydraulic pressure in the accumulator 108.

An increase gradient of the hydraulic pressure in the accumulator 108 is larger in the case where a flow rate of the working fluid discharged from the pump 104 is high than in the case where the flow rate is low. This flow rate is higher in the case where a voltage applied to the pump motor 105, i.e., a source voltage is high than in the case where the voltage is low.

In view of the above, an air presence/absence judgment time Tth is determined at a length of time which is shorter in the case where the voltage of the pump motor 105 is high than in the case where the voltage of the pump motor 105 is low. The air presence/absence judgment time Tth is determined according to the air presence/absence judgment time determination table indicated in the map in FIG. 4.

The set pressure Paccth may be determined based on the initial pressure of the accumulator 108, for example, and may be determined at pressure having a magnitude which can be used for determination of the presence or absence of the air, for example.

As illustrated in FIG. 7, in the case where the high pressure line 102 is replaced, for example, original control of the rear-hydraulic-pressure control device 28 is inhibited. In other words, execution of a program relating to the original hydraulic pressure control is inhibited in the brake ECU 20 to inhibit a start and a stop of the pump motor 105 and control of the linear valve device 98 according to the program relating to the hydraulic pressure control. This is because air may spread when the pump 104 or other similar devices are actuated in the state in which the air exists.

When the air bleeding instruction is issued, the air bleeding program is executed in the brake ECU 20. When the air bleeding program is executed, the pump motor 105 is actuated and stopped, and the pressure-increase linear valve 160 is opened and closed. When it is determined that the air bleeding has succeeded, the execution of the program relating to the original hydraulic pressure control is kept permitted.

Figure 3:
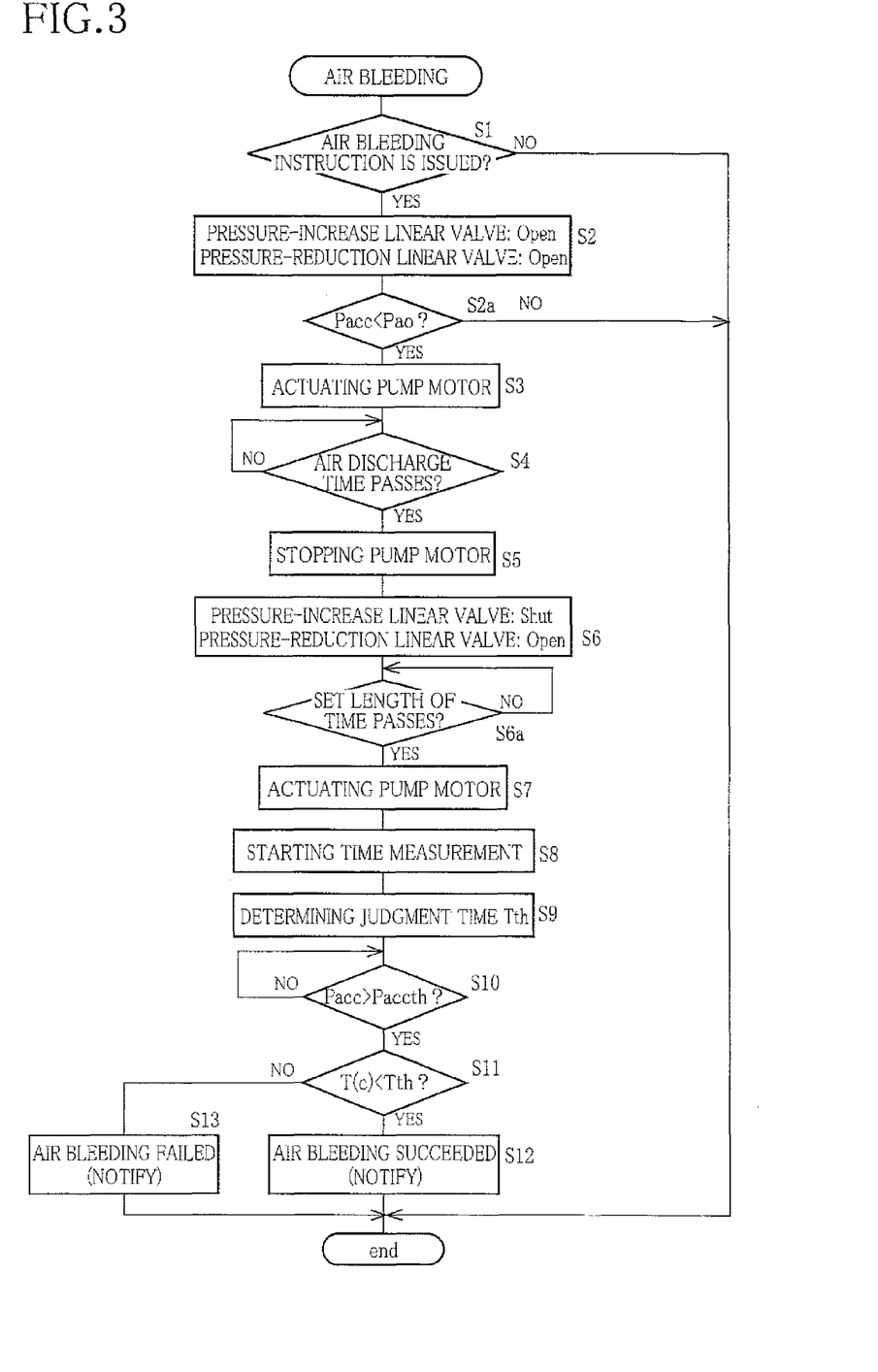
FIG. 3 is a flow chart illustrating an air bleeding program stored in a storage device of the brake ECU.
Figure 4:
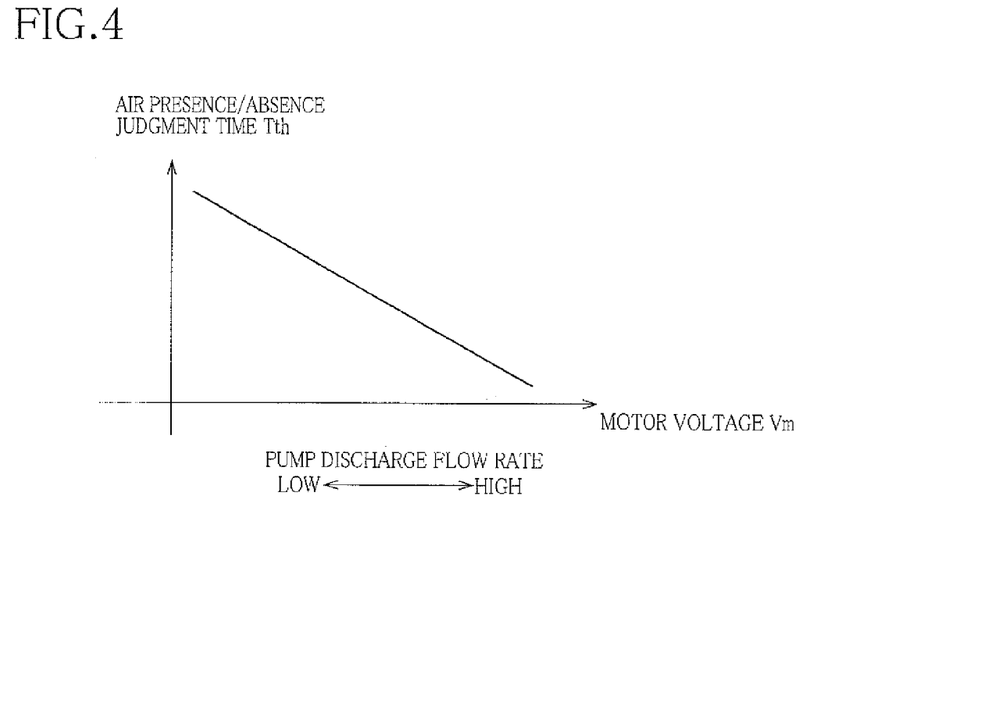
FIG. 4 is a map illustrating an air presence/absence judgment time determination table stored in the storage device of the brake ECU.

The air bleeding is performed according to the air bleeding program indicated in by the flow chart in FIG. 3 in a repair/check factory, for example.

At Step 1 (hereinafter, "Step" is omitted where appropriate), it is determined whether the air bleeding instruction is issued or not. It may be determined that the air bleeding instruction is issued when an operating member provided on the vehicle such as the brake pedal 24 or the accelerator pedal is operated with a predetermined pattern. The predetermined pattern is a pattern which is not used normally.

When it is determined that the air bleeding instruction is issued, the pressure-increase linear valve 160 and the pressure-reduction linear valve 162 are opened at S2. As a result, the pump 104, the line 102, the pressure-increase linear valve 160, the control pressure chamber 122, the pressure-reduction linear valve 162, the reservoir passage 84, and the reservoir 52 communicate with each other to form the air bleeding path 250.

It is determined at S2a whether or not the accumulator pressure is lower than set pressure Pao that is generally equal to the atmospheric pressure. In the case where the line 102 or the pump 104 is replaced, it is possible to consider that accumulator pressure Pacc is generally equal to the atmospheric pressure and lower than the actuation permitting hydraulic pressure Pao.

At S3, the pump motor 105 is actuated. The working fluid discharged from the pump 104 is supplied to the air bleeding path 250 and discharged to the reservoir 52. Also, the working fluid of the reservoir 52 is pumped up and discharged by the pump 104, and the working fluid is circulated. Thus, the working fluid flows through the air bleeding path 250 to discharge air from the air bleeding path 250 to the reservoir 52.

The pump 104 is operated during the air discharge time Tp. When the air discharge time Tp passes, a positive decision (YES) is made at S4, the pump motor 105 is stopped at S5, and the pressure-increase linear valve 160 is at 56 switched back to the closed state. The air discharge time Tp can be determined based on a time required to discharge the air by the flow of the working fluid through the air bleeding path 250.

As described above, execution of the processings at S1-S6 corresponds to the working fluid flowing step.

After the completion of the working fluid flowing step, it is determined at S6a whether a set length of time passes or not. After the set length of time passes, the check step (S7-S13) is started.

The pump motor 105 is at S7 actuated, and at S8 measurement (counting) of time is started. At S9, a voltage Vm applied to the pump motor 105 is detected, and the air presence/absence judgment time Tth is determined. It is determined at S10 whether the accumulator pressure becomes higher than the set pressure Paccth or not. When the accumulator pressure becomes higher than the set pressure Paccth, a positive decision (YES) is made at S10. It is determined at S11 whether a time elapsed from the actuation of the pump motor 105 is shorter than the air presence/absence judgment time Tth or not. When the time elapsed from the actuation of the pump motor 105 is shorter than the air presence/absence judgment time Tth, it is determined that the air bleeding has succeeded, and notification is provided about this information at S12. In the present embodiment, a result of the check is displayed on the display 206. Since the air bleeding is finished, the execution of the program relating to the original hydraulic pressure control is permitted. As illustrated in FIG. 7, the execution of the accumulator-pressure control program causes the pump motor 105 to be operated continuously and stopped when the hydraulic pressure Pacc of the accumulator 108 reaches the upper limit pressure PH of the set range.

When the time elapsed from the actuation of the pump motor 105 is longer than or equal to the air presence/absence judgment time Tth, it is determined that the air bleeding has failed, and notification is provided about this information at S13. In this case, the pump motor 105 is stopped temporarily. When the air bleeding has failed, the air bleeding operation (S1-S5) is performed again. This air bleeding operation is also started in response to the air bleeding instruction (S1) but may be automatically started based on the result of the check without the air bleeding instruction. For example, the pump motor 105 may be stopped just after the processing at S13, and then the processing at S2 may be executed.

In the present embodiment as described above, it is possible to satisfactorily discharge air from, e.g., the line 102 as at least a portion of the rear-hydraulic-pressure control device 28. Also, the air bleeding operation can be performed in a state in which no air-contained working fluid is supplied to the rear chamber 66. Also, since the air bleeding instruction is issued in response to the predetermined pattern of operation of the operating device mounted on the vehicle, the air bleeding can be performed without an external device for outputting the air bleeding instruction, for example.

It is noted that, as illustrated in FIG. 7, the execution of the program relating to the original hydraulic pressure control can also be considered to be permitted during the air discharge time Tp after the air bleeding instruction is issued, and this is for the following reason. In the case where the line 102 is replaced, for example, the hydraulic pressure in the accumulator 108 is generally equal to the atmospheric pressure and lower than the lower limit pressure PL of the set range. Thus, the pump motor 105 is actuated by the execution of the program relating to the hydraulic pressure control (an accumulator-pressure control program).

This applies to the case where the check step is started. That is, it is possible to consider that the pump motor 105 is actuated by permission of the execution of the accumulator-pressure control program and that in the case where it is determined that the air bleeding is finished, the pump motor 105 is operated by the execution of the accumulator-pressure control program until the hydraulic pressure in the accumulator 108 reaches the upper limit pressure PH. Thus, in the case where the line 102 is replaced, for example, the execution of the accumulator-pressure control program in the brake ECU 20 is inhibited, but in the case where the hydraulic pressure in the accumulator 108 is lower than the lower limit pressure PL, the execution of the accumulator-pressure control program is permitted, and the pump motor 105 is actuated. Accordingly, in the case where the pump motor 105 needs to be operated in the air bleeding operation, the execution of the accumulator-pressure control program may be permitted, and an instruction for operating the pump motor 105 may be directly issued.

While both of the working fluid flowing step and the check step are executed successively in response to the air bleeding instruction in the present embodiment, the working fluid flowing step may be executed in response to a working-fluid flowing instruction, and the working fluid flowing step may be executed in response to a check instruction.

The processings at S2a and S6a are not essential.

Also, the voltage monitor 204 detects the voltage of the pump motor 105 in the present embodiment but may detect a power source (battery) voltage or an IG voltage, for example. Any physical quantity may be detected as long as the physical quantity can be used for estimating the actual discharge flow rate of the pump 104.

In the present embodiment, in view of the above, the air bleeding device is constituted by the brake ECU 20 and so on. An air bleeding path forming device is constituted by portions of the brake ECU 20 which store and execute the processing at S2 in the air bleeding program, for example. A pump-device control device and a working-fluid communicating device are constituted by portions of the brake ECU 20 which store and execute the processings at S2a and S3-S5, for example. An air-bleeding-state determining device is constituted by portions of the brake ECU 20 which store and execute the processings at S7-S13, for example. An air-presence-judgment-time determining device is constituted by portions of the brake ECU 20 which store and execute the processings at the processing at S9 and the table in FIG. 4, for example. A regulator-actuation preventing device is constituted by portions of the brake ECU 20 which store and execute the processings at S2a and S3, for example. It is noted that the execution of the processing at S2 corresponds to an air bleeding path forming step, and the execution of the processings at S2a and S3-S5 corresponds to a pump operating step.

Embodiment 2

Figure 8A:
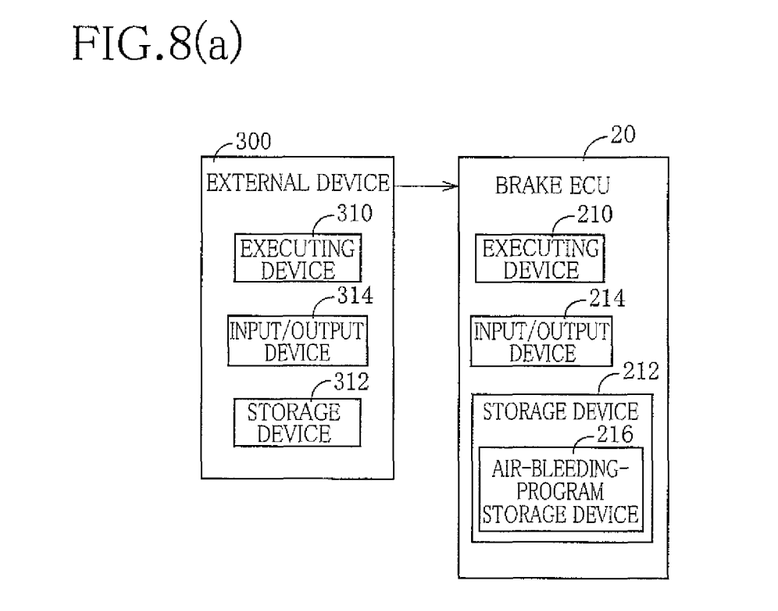
FIG. 8(a) is a view schematically illustrating a main portion of hydraulic braking system according to Embodiment 2 of the present invention.

In the present embodiment, as illustrated in FIG. 8A, an external device 300 and the brake ECU 20 are connected to each other. The external device 300 may be a PC constituted mainly by a computer including an executing device 310, a storage device 312, and an input/output device 314, for example. When the air bleeding instruction (the air bleeding command) is output from the external device 300 to the brake ECU 20, the brake ECU 20 executes the air bleeding program, and the hydraulic braking system performs the air bleeding.

In the present embodiment, it is possible to consider that the air bleeding device is constituted by the brake ECU 20 and a portion of the external device 300 which outputs the air bleeding command.

Embodiment 3

Figure 8B:
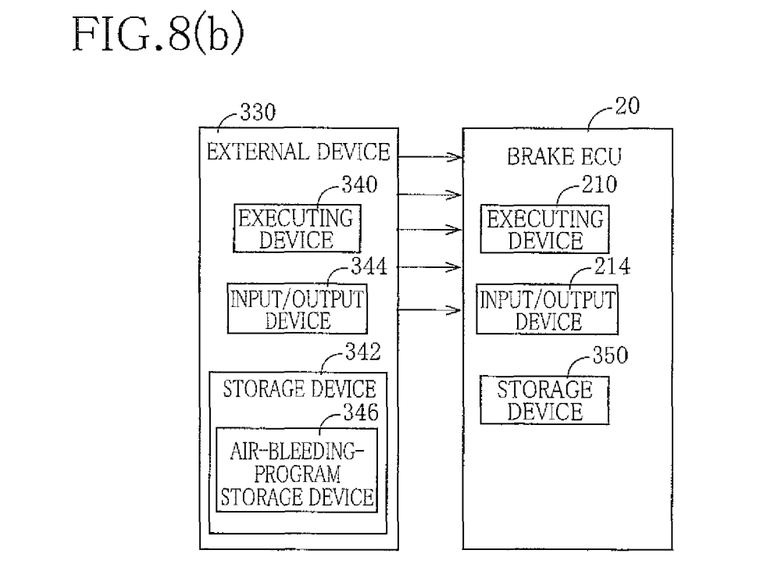
FIG. 8(b) is a view schematically illustrating a main portion of an air bleeding device according to Embodiment 3 of the present invention.

Also in the present embodiment, as illustrated in FIG. 8B, an external device 330 and the brake ECU 20 are connected to each other. The external device 330 is constituted mainly by a computer including an executing device 340, a storage device 342, and an input/output device 344. The storage device 342 includes an air-bleeding-program storage device 346 storing the air bleeding program. A storage device 350 of the brake ECU 20 does not store the air bleeding program.

When the air bleeding program is executed in the external device 330, an instruction is output to the brake ECU 20 to open and close the pressure-increase linear valve 160 and actuate and stop the pump motor 105, that is, the working fluid flowing step and the check step are executed. In the present embodiment, the external device 330 constitutes the air bleeding device.

It is noted that the hydraulic braking system to which the present invention is applied is not limited to that according to the present embodiment. For example, the regulator 97 is not essential in the rear-hydraulic-pressure control device 28.

It is to be understood that the present invention is not limited to the details of the illustrated embodiments, but may be embodied with various changes and modifications, which may occur to those skilled in the art. For example, the present invention is also applicable to hydraulic-pressure control devices different from the rear-hydraulic-pressure control device 28.

EXPLANATION OF REFERENCE NUMERALS 4, 10: Hydraulic Brake, 6, 12: Brake Cylinder, 14: Hydraulic-Pressure Producing Device, 20: Brake ECU, 26: Master Cylinder, 28: Rear-hydraulic-pressure Control Device, 52: Reservoir, 66: Rear Chamber, 84: Reservoir Passage, 96: High Pressure Source, 105: Pump Motor, 104: Pump, 97: Regulator, 108: Accumulator, 122: Control Pressure Chamber, 124: Servo Chamber, 126: High-pressure Supply Valve, 160: Pressure-increase Linear Valve, 162: Pressure-reduction Linear Valve, 202: Operating-device-operation-state Detection Device, 204: Voltage Monitor, 212: Storage Device, 216: Air-bleeding-program Storage Device, 102: Line, 250: Air bleeding path, 300, 330: External Device, 342: Storage Device, 342: Air-bleeding-program Storage Device

The invention claimed is:

1. A hydraulic braking system, comprising:
a master cylinder comprising: a pressurizing piston fluid-tightly and slidably fitted in a housing; a front pressure chamber located in front of the pressurizing piston and connected to a brake cylinder; and a rear chamber located behind the pressurizing piston;
a rear-hydraulic-pressure control device connected to the rear chamber of the master cylinder and configured to supply control hydraulic pressure to the rear chamber; and
an air bleeding device configured to perform air bleeding for a first portion of the rear-hydraulic-pressure control device while preventing a working fluid that is used to perform the air bleeding from being supplied to a second portion of the rear-hydraulic-pressure control device, the second portion being connected to the rear chamber.

2. The hydraulic braking system according to claim 1,
wherein the rear-hydraulic-pressure control device comprises a high pressure source comprising a pump device, and
wherein the air bleeding device comprises (i) an air bleeding path forming device configured to form an air bleeding path comprising the first portion of the rear-hydraulic-pressure control device and (ii) a pump-device control device configured to cause the working fluid to flow into the air bleeding path formed by the air bleeding path forming device, by actuating the pump device in a state in which hydraulic pressure in the high pressure source is less than actuation permitting hydraulic pressure.

3. The hydraulic braking system according to claim 1,
wherein the rear-hydraulic-pressure control device comprises a high pressure source and a regulator comprising (a) a control piston, (b) a servo chamber formed in front of the control piston and connected to the rear chamber, (c) a control pressure chamber formed behind the control piston, the first portion of the rear-hydraulic-pressure control device passing through the control pressure chamber, and (d) a high-pressure supply valve provided between the servo chamber and a high pressure chamber connected to the high pressure source, the high-pressure supply valve being configured to be switched from a closed state to an open state when the control piston is moved forward by greater than or equal to a set stroke, and
wherein the air bleeding device comprises a regulator-actuation preventing device configured to prevent the high-pressure supply valve from being switched to the open state by forward movement of the control piston.

4. The hydraulic braking system according to claim 1,
wherein the rear-hydraulic-pressure control device comprises (a) a pump device and (b) a high pressure source comprising an accumulator configured to store the working fluid discharged from the pump device in a pressurized state, and
wherein the air bleeding device comprises (i) an air-bleeding-state determining device configured to determine that air is in the first portion of the rear-hydraulic-pressure control device when a time required for hydraulic pressure in the accumulator to reach a set pressure from actuation of the pump device exceeds an air presence judgment time in a state in which the high pressure source is isolated from a reservoir and (ii) an air-presence-judgment-time determining device configured to shorten the air presence judgment time as a flow rate of the working fluid discharged from the pump device increases.

5. An air bleeding method for performing air bleeding for a first portion of a rear-hydraulic-pressure control device, the rear-hydraulic-pressure control device being connected to a rear chamber formed behind a pressurizing piston of a master cylinder, the rear-hydraulic-pressure control device being configured to supply control hydraulic pressure to the rear chamber, the air bleeding method comprising:

an air bleeding path forming step of forming an air bleeding path comprising the first portion of the rear-hydraulic-pressure control device; and     a pump operating step of operating a pump device for an air bleeding time to cause a working fluid to flow into the first portion of the rear-hydraulic-pressure control device and be discharged to a low pressure source while preventing the working fluid from being supplied from the air bleeding path to a second portion of the rear-hydraulic-pressure control device, the second portion being connected to the rear chamber.

6. The air bleeding method according to claim 5, further comprising:

a working fluid flowing step of operating the pump device to cause the working fluid to flow to the first portion of the rear-hydraulic-pressure control device, and to be discharged to the low pressure source; and     an air bleeding checking step of checking a remaining state of air in the first portion of the rear-hydraulic-pressure control device after the working fluid flowing step.

7. An air bleeding device configured to perform air bleeding for a first portion of a rear-hydraulic-pressure control device, the rear-hydraulic-pressure control device being connected to a rear chamber formed behind a pressurizing piston of a master cylinder, the rear-hydraulic-pressure control device being configured to supply control hydraulic pressure to the rear chamber,     the air bleeding device comprising a working-fluid communicating device configured to perform air bleeding by causing a working fluid to flow to the first portion of the rear-hydraulic-pressure control device while preventing the working fluid from being supplied to a second portion of the rear-hydraulic-pressure control device, the second portion being connected to the rear chamber.

\* \* \* \* \*